United States Patent [19]
Dench et al.

[11] 4,042,017
[45] Aug. 16, 1977

[54] PRODUCE WARMER

[75] Inventors: Robert H. Dench, Monte Sereno; Victor J. Dervin, Cupertino, both of Calif.

[73] Assignee: Mobile Product Services, Inc., Burlingame, Calif.

[21] Appl. No.: 626,663

[22] Filed: Oct. 29, 1975

[51] Int. Cl.² ............................................. F25B 29/00
[52] U.S. Cl. ......................................... 165/63; 62/79; 62/376
[58] Field of Search ...................... 165/107, 63; 62/79, 62/376, 434, 305

[56] References Cited

U.S. PATENT DOCUMENTS

| | | | |
|---|---|---|---|
| 3,935,899 | 2/1976 | Jolly | 165/63 UX |
| 3,952,947 | 4/1976 | Saunders | 62/238 X |

*Primary Examiner*—Alan Cohan
*Attorney, Agent, or Firm*—Lothrop & West

[57] ABSTRACT

A produce warmer for raising the temperature of cold produce taken from a cold environment and about to be processed includes a refrigerant circuit in which an evaporative cooler and a heat exchanger are arranged in series for circulation of a refrigerant between them. The direction is such that heat is taken from the heat exchanger and is transferred to the evaporative cooler. There is a first housing for warm produce to be cooled, and this housing is included in a secondary water circuit also inclusive of the heat exchanger. The water in the secondary circuit is circulated in a direction to pick up heat from the produce and to transfer such heat to the heat exchanger. Following this the returning cool water is sprayed over the warm produce in the first housing and is recirculated. Should there be no warm produce for the first housing, an alternative supply of heat is afforded by a fan introducing warm air to the first housing. A tertiary water circuit includes a second housing for produce to be warmed and also includes the evaporative cooler. In the tertiary circuit a pump takes relatively warm water from the evaporative cooler and sprays it over produce to be warmed in the second housing. The sprayed water, which has been cooled by yielding heat to and so warming produce in the second housing, is returned to the evaporative cooler, wherein it is again warmed and from which it is recirculated.

4 Claims, 1 Drawing Figure

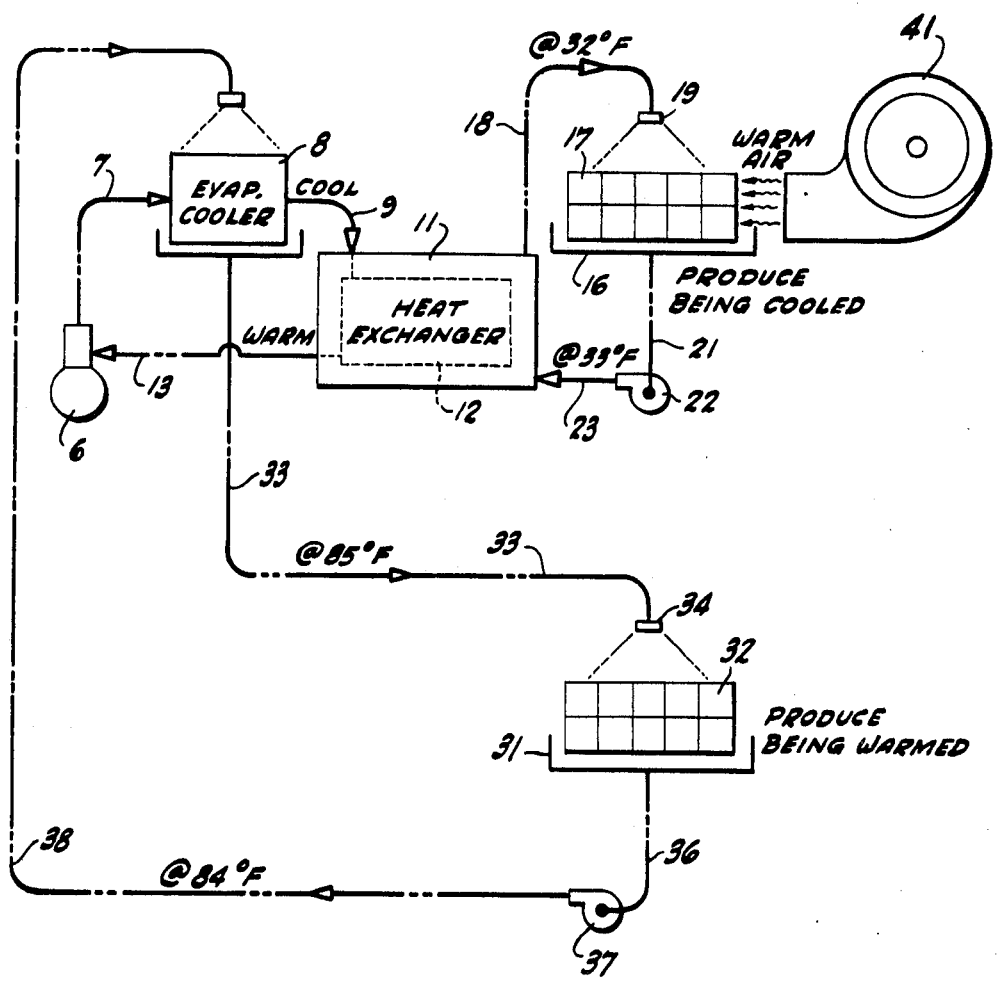

PRODUCE WARMER

In the handling of large amounts of produce, it is often the case that the produce is dispatched to a processing point or cannery while it contains considerable field heat, which it is desired to remove. By contrast, it is sometimes the case that produce to be processed has been held for a protracted period in cold storage and must be withdrawn for processing. It is advisable then to warm the cold produce and preferably to do so in a fashion so that the produce is warmed uniformly and evenly. This allows the settings of the subsequent processing machinery, such as pitting devices, to be exact and to be confined within narrow limits. Otherwise, if the cool produce is merely warmed superficially or only on the outside and remains cold on the inside, then the subsequent handling or pitting equipment is hampered and the processing is not optimum.

It is therefore an object of our invention to provide a produce warmer which can easily be operated to warm uniformly produce which is initially too cool.

Another object of our invention is to provide a produce warmer which can be operated by waste heat.

A further object of the invention is to provide a produce warmer which can operate on heat extracted from other produce to be cooled.

Another object of the invention is to provide a produce warmer effective to provide uniform results over a large mass of produce.

A further object of the invention is in general to provide an improved produce warmer.

Other objects, together with the foregoing, are attained in the embodiment of the invention described in the accompanying description and illustrated in the accompanying drawing, in which:

The FIGURE is a diagram showing one form of produce warmer pursuant to the invention.

While the produce warmer pursuant to the disclosure can be employed in a widely different number of environments with a widely variant number of articles, it has with considerable success been employed in connection with produce, particularly certain fruit; for example, peaches and pears. It is customary in the packing and produce handling industry in order to even out processing loads and to take account of variations in ripening times and the like often to store freshly picked fruit in a cold storage warehouse for a protracted period and then to withdraw such cold storage fruit for processing, especially pitting and canning, when desired. A difficulty is that the cold storage fruit in order to be preserved for a long time must have its temperature substantially lowered below surrounding temperatures. If such fruit is then removed from cold storage and is left to warm in the atmosphere, very often the individual fruit does not warm uniformly nor is a uniform temperature attained throughout a substantial load. The time involved may be unduly long. The character of the flesh of the fruit may be variable and may not respond uniformly to the customary packing and handling machinery. It has been recognized for some time that a fast and uniform warming arrangement would be desirable, but the utilization of extra energy for such purposes is not normally indicated, and no good arrangement has appeared.

We have provided an arrangement as shown in the accompanying diagram in which a heat transfer mechanism is employed. In this instance there is a refrigeration unit of a standard sort including and represented by a compressor 6 appropriately driven. This unit provides a refrigerant discharge through a conduit 7 into one portion of a heat exchanger 8, particularly in the form of the well-known evaporative cooler. In passing through such evaporative cooler, the refrigerant from the conduit 7 has its temperature reduced and is discharged into a conduit 9 at a relatively low temperature. Such cooled refrigerant then enters into a surface heat exchanger 11 having a heat exchange unit 12 through which the refrigerant travels. As it goes through the heat exchanger 12, as will later appear, the refrigerant is warmed and issues through a conduit 13 in a relatively warm condition and is returned to the compressor 6 at an elevated temperature, thus completing a substantially closed refrigerant circuit, referred to herein as a primary refrigerant circuit.

It is often the case in the area wherein fruit must be warmed from a cold temperature to a workable, higher temperature that at the same time there is also to be processed fruit just in from the growing areas and still containing field heat. Customarily, the picking temperature and summer atmospheric temperatures are relatively high. The just-picked fruit is too warm for processing or handling and must be subjected to a cooling operation.

Under those circumstances, we provide a housing 16, referred to as a first housing, in which a first load 17 such as containers of just-picked, warm peaches may be temporarily positioned. Derived from the heat exchanger 11; for example, from a jacket surrounding the chamber 12 through a conduit 18 is a supply of cold water, serving as a heat transfer medium, preferably at a temperature slightly above freezing but referred to as 32° F. This water is discharged under pressure through a shower head 19 or nozzle over the lading 17, so that the water permeates all of the lading, coming into immediate heat transfer contact with the individual fruit, such as peaches, and taking heat from the peaches into the water, thus reducing the lading temperature while increasing the water temperature.

The water which has showered down over the lading 17 is caught on the floor or in a suitable receptacle in the enclosure 16 and is then transferred through a conduit 21 to a force pump 22 appropriately driven and effective to discharge the received water through a conduit 23 to the heat exchanger 11. The water, having passed through the lading and absorbed heat therefrom and through the pump 22, travels back to the heat exchanger at a temperature of approximately 33° F. That is, a temperature rise of about 1° F. is accomplished by absorbing or deriving heat from the lading 17, which is correspondingly cooled. It is the transfer of heat from the lading 17 to the heat exchanger that causes the cool refrigerant in the conduit 9 to leave the heat exchanger at a warmer temperature through the conduit 13. There is, consequently, supplied to the evaporative cooler 8 a substantial amount of heat or thermal energy at a relatively high temperature.

In accordance with the invention, we provide a second housing 31 in which a load 32 of produce to be warmed may be installed. The produce 32 may be boxes or containers of fruit such as peaches which have undergone cold storage for a protracted period and which are at a very low temperature. There is derived from the evaporative cooler 8 a supply of relatively warm water; say, at a temperature of 85° F., which flows through a conduit 33 into a shower head 34 or spray so that such water or heat transfer agent is discharged over all of the lading 32 and comes into immediate contact with the fruit.

Since the heat transfer liquid or water is at a relatively high temperature and is in general contact with the fruit, the result is that the fruit temperature rises because of the heat transferred thereto and does so in quite a uniform fashion, for the water simultaneously engages all portions of the lading. In travelling through the lading 32, the incoming water loses heat and its temperature drops to a value, usually several degrees lower. The cool fruit is warmed. The water draining from the lading is collected and flows through a conduit 36 into a force pump 37, from which it is discharged through a conduit 38 to the evaporative cooler 8. The relatively cool water supplied to the evaporative cooler picks up heat therefrom which has been indirectly supplied thereto from the lading 17.

In effect, therefore, the cool produce to be warmed is so warmed by being doused or drenched with relatively warm water which has been heated by being used to drench or spray produce which is too hot. The energy transfer is substantial, although the mechanical energy required is relatively small, being only that due to operate the refrigerator compressor 6 and the pumps 22 and 37. Thus an available massive supply of heat energy is utilized to produce a uniform and acceptably high temperature in otherwise excessively cold lading.

It is not always that there is close synchronism between a load of cold storage fruit to be warmed and a load of produce having field heat to be cooled.

The mechanism is therefore arranged to use an alternate supply of heat. Should the first housing 16 be empty for lack of produce 17 with field heat in it, such housing is then supplied with heat from the atmosphere. There is an appropriately driven blower 41 effective to pull in ambient or atmospheric air from the vicinity and to blow it into and through the first housing 16. In many areas in which fruit is available from time to time, the daytime atmospheric temperature, and sometimes the temperature for many hours of the night, is of the order of from 85° to 105°. When such air is available, it is supplied to the first housing 16. The heat therein is transferred to the water spray which falls from the nozzle 19 into the outlet conduit 21. Sufficient heat can be picked up in that fashion to make the rest of the cycle proceed, as described.

It is possible to arrange matters so that only atmospheric air is utilized, and in that case the housing 16 is not designed to receive produce 17. It is also possible to rely solely upon warm produce being available and to omit the blower 41, and finally it is possible to utilize a balanced combination of warm lading 17 and hot ambient air from the blower 41. In any case, there is afforded quite economically a large supply of heat effective at relatively small temperature differences to provide cold storage fruit with a more elevated temperature in a uniform fashion to fit it for subsequent appropriate processing.

What is claimed is:

1. A produce warmer comprising an evaporative cooler, a heat exchanger, a primary refrigerant circuit including said evaporative cooler and said heat exchanger in series, means in said primary refrigerant circuit for circulating refrigerant therein in a direction through said evaporative cooler wherein said refrigerant is cooled and then through said heat exchanger wherein said refrigerant is warmed and then back to said evaporative cooler, a first housing for produce to be cooled, a secondary water circuit including said first housing and said heat exchanger in series, means in said secondary water circuit for circulating water therein in a direction through said heat exchanger wherein said water is cooled and then through said first housing wherein said water is warmed by heat transfer from produce therein and then back to said heat exchanger, a second housing for produce to be warmed, a tertiary water circuit including said second housing and said evaporative cooler in series, and means in said tertiary water circuit for circulating water therein in a direction through said evaporative cooler wherein said water is warmed and then through said second housing wherein said water is cooled by heat transfer to produce therein and then back to said evaporative cooler.

2. A device as in claim 1 in which said secondary water circuit includes means in said first housing for spraying circuit water over produce therein and for collecting and recirculating sprayed water draining from said produce therein.

3. A device as in claim 1 in which said tertiary water circuit includes means in said second housing for spraying circuit water over produce therein and for collecting and recirculating sprayed water draining from said produce therein.

4. A device as in claim 1 including means for circulating relatively warm air through said first housing.

* * * * *